United States Patent
Aitken et al.

(10) Patent No.: US 11,459,216 B2
(45) Date of Patent: Oct. 4, 2022

(54) NACELLE MOUNTABLE LIFT SYSTEM FOR A WIND TURBINE

(71) Applicant: LiftWerx Holdings Inc., Cambridge (CA)

(72) Inventors: Glen D. Aitken, Fergus (CA); Ruud Bakker, Zaandam (NL)

(73) Assignee: LiftWerx Holdings Inc., Cambridge (CA)

( * ) Notice: Subject to any disclaimer, the term of this patent is extended or adjusted under 35 U.S.C. 154(b) by 56 days.

(21) Appl. No.: 17/045,196

(22) PCT Filed: May 1, 2019

(86) PCT No.: PCT/CA2019/050568
§ 371 (c)(1),
(2) Date: Oct. 5, 2020

(87) PCT Pub. No.: WO2019/213748
PCT Pub. Date: Nov. 14, 2019

(65) Prior Publication Data
US 2021/0047155 A1    Feb. 18, 2021

Related U.S. Application Data

(60) Provisional application No. 62/775,687, filed on Dec. 5, 2018, provisional application No. 62/667,458, filed on May 5, 2018.

(51) Int. Cl.
*B66C 23/18*   (2006.01)
*F03D 13/10*   (2016.01)
(Continued)

(52) U.S. Cl.
CPC ............ *B66C 23/185* (2013.01); *B66C 1/108* (2013.01); *F03D 13/10* (2016.05); *F03D 80/50* (2016.05); *F05B 2230/61* (2013.01)

(58) Field of Classification Search
CPC ...... F05B 2230/61; F03D 13/10; F03D 80/50; B66C 1/108; B66C 23/185; B66C 23/207
See application file for complete search history.

(56) References Cited

U.S. PATENT DOCUMENTS

| | | | | |
|---|---|---|---|---|
| 2,994,513 A | * | 8/1961 | Bowerman | ............ B66D 3/043 |
| | | | | 254/362 |
| 9,086,051 B2 | | 7/2015 | Park et al. | |

(Continued)

FOREIGN PATENT DOCUMENTS

| | | |
|---|---|---|
| CN | 102491162 A | 6/2012 |
| DE | 102006013539 A1 | 9/2007 |

(Continued)

OTHER PUBLICATIONS

Extended European Search Report dated Dec. 15, 2021 on EP 19800561.3.

(Continued)

*Primary Examiner* — Moshe Wilensky
(74) *Attorney, Agent, or Firm* — Brunet & Co. Ltd.; Robert Brunet; Hans Koenig

(57) ABSTRACT

A lift system mountable in a nacelle of a wind turbine has a boom having a proximal end mountable in the nacelle and a distal end extending over a hub of a rotor of the wind turbine when the lift system is mounted in the nacelle. The lift system has a frame structure for mounting the proximal end of the boom in the nacelle, a winch mounted to the boom, a fastener situated below the boom and operatively connected to the winch by at least one cable, and a trolley movably mounted to the boom to permit translation of the trolley longitudinally along the boom thereby permitting longitudinal movement of the fastener with respect to the boom.

15 Claims, 9 Drawing Sheets

(51) Int. Cl.
   *B66C 1/10*   (2006.01)
   *F03D 80/50*   (2016.01)

(56)   References Cited

U.S. PATENT DOCUMENTS

| | | |
|---|---|---|
| 9,415,978 B2 | 8/2016 | Fenger |
| 2012/0126542 A1* | 5/2012 | Deng ................. F03D 3/065 290/55 |

FOREIGN PATENT DOCUMENTS

| | | |
|---|---|---|
| EP | 1291521 A1 | 3/2003 |
| EP | 1677007 A2 | 7/2006 |
| WO | 2005/031159 A1 | 4/2005 |
| WO | 2018/041313 A1 | 3/2018 |

OTHER PUBLICATIONS

International Preliminary Report on Patentability dated Aug. 4, 2020 on PCT.CA2019/050568.

\* cited by examiner

NACELLE MOUNTABLE LIFT SYSTEM FOR A WIND TURBINE

This application is a national entry of PCT/CA2019/050568 filed May 1, 2019 and claims the benefit of United States Provisional Patent Applications U.S. Ser. No. 62/775,687 filed Dec. 5, 2018 and U.S. Ser. No. 62/667,458 filed May 5, 2018, the entire contents of all of which are herein incorporated by reference.

FIELD

This application relates to lift systems, especially to a lifting appliance mountable on wind turbines.

BACKGROUND

Wind turbines require periodic maintenance to remain operable. Due to the extreme height at which many wind turbines operate, maintaining and/or replacing turbine parts (e.g. a rotor, blade, main bearing, main shaft, intermediate shaft, gearbox, etc.) becomes problematic. For reasons of safety and practicality, turbine parts are generally lowered to ground level for maintenance and/or replacement. Typically, a crane is used to lower (and then re-raise) the parts to be maintained or replaced.

There have been a number of cranes developed in the prior art specifically adapted for maintenance of various parts of the wind turbine. For example, the cranes disclosed in co-pending U.S. patent applications Ser. No. 15/916,364 filed Mar. 9, 2018 and 62/589,778 filed Nov. 22, 2017, the entire contents of both of which are herein incorporated by reference, are capable of lifting various turbine components, as well as lifting part of other cranes that can be mounted on the wind turbine.

However, there still remains a need for a turbine-mounted crane that is capable of lifting, moving and lowering heavy turbine components, such as a fully-assembled rotor and/or a fully-assembled main shaft assembly.

SUMMARY

In one aspect, there is provided a lift system mountable in a nacelle of a wind turbine, the lift system comprising: a boom comprising a proximal end and a distal end, the proximal end of the boom mountable in the nacelle, the distal end of the boom extending over a hub of a rotor of the wind turbine when the lift system is mounted in the nacelle; a frame structure for mounting the proximal end of the boom in the nacelle; a winch mounted to the boom; a fastener situated below the boom and operatively connected to the winch by at least one cable; and, a trolley movably mounted to the boom to permit translation of the trolley longitudinally along the boom thereby permitting longitudinal movement of the fastener with respect to the boom.

In some embodiments, the boom may be a beam or a truss structure. The boom may extend longitudinally with respect to a major axis of the nacelle when the lift system is mounted in the nacelle. To extend longitudinally, the boom does not need to be exactly parallel to the longitudinal axis of the nacelle, but can be angled by an amount, for example about 20° or less, preferably about 10° or less, horizontally and/or vertically with respect to the longitudinal axis of the nacelle. Preferably, the boom is substantially not angled horizontally with respect to the longitudinal axis of the nacelle. Preferably, the boom is angled vertically with respect to the longitudinal axis of the nacelle by an amount of about 10° or less.

In one embodiment, the frame structure comprises a mounting base mountable on a structure capable of supporting all forces imparted to the nacelle by the lift system including the weight of the lift system, for example pillow blocks of a gearbox of the wind turbine, a bedplate, a generator, etc. In one embodiment, the frame structure comprises a plurality of upwardly extending support struts. In one embodiment, at least one of the support struts is supportable on the mounting base. In one embodiment, at least one of the support struts is mountable at a position in the nacelle proximate a main bearing of the wind turbine, for example on a yaw drive mount. In one embodiment, the plurality of upwardly extending support struts comprises a first strut mountable on the mounting base over a first gearbox pillow block of the nacelle, a second strut mountable on the mounting base over a second gearbox pillow block of the nacelle, a third strut mountable at a first position in the nacelle proximate the main bearing, for example on a first yaw drive mount of the nacelle, and a fourth strut mountable at a second position in the nacelle proximate the main bearing, for example on a second yaw drive mount of the nacelle.

In one embodiment, the winch is mounted on an upper surface of the boom. In one embodiment, the winch is mounted underneath the boom. In one embodiment, the at least one cable comprises first and second cables, and the first and second cables between the winch and the fastener pass, respectively, on first and second transverse sides of the boom so that the cables do not interfere with longitudinal translation of the trolley on the boom. In one embodiment, lengths of the first and second cables are independently adjustable to permit steering a load connected to the fastener. In one embodiment, the first cable is linked to a first hydraulic cylinder mounted on the first side of the boom and the second cable is linked to a second hydraulic cylinder mounted on the second side of the boom. In one embodiment, the links are direct connections of the cables to the hydraulic cylinders, although in other embodiments the links may be formed with linking structures between the cables and the hydraulic cylinders. The first and second hydraulic cylinders may be independently actuatable to independently adjust the lengths of the first and second cables.

In one embodiment, the wind turbine further comprises a main drive shaft mounted in the nacelle, the main drive shaft having a longitudinal axis oriented at a non-zero angle away from horizontal. In one embodiment, the boom has a longitudinal axis substantially parallel to the longitudinal axis of the main drive shaft. In one embodiment, the trolley translates longitudinally along a path substantially parallel to the longitudinal axis of the main drive shaft.

In one embodiment, the trolley extends transversely beyond the transverse sides of the boom. In one embodiment, the trolley comprises a first trolley sheave on a first transverse side of the boom and a second trolley sheave on a second transverse side of the boom, and the cables are reeved through the first and second trolley sheaves. Each of the first and second trolley sheaves may comprise one sheave or more than one sheave disposed side-by-side. In one embodiment, the winch is mounted on the trolley and moves with the trolley.

In one embodiment, the trolley comprises two or more movably connected pieces, for example two movably connected pieces, which can move relative to each other, for example in directions transverse to the direction of travel of the trolley, to permit yawing the load on the lift system. The two or more pieces may be movably connected, for example, by linkages, actuators or a combination thereof. For example, if the first and second hydraulic cylinders are independently actuatable and one or more linear bearings bridge the two or more pieces, a suitable arrangement would be provided.

The lift system of the present invention is safer, less costly and more reliable than existing cranes for lifting very heavy components (e.g. a fully-assembled rotor, a fully assembled main shaft assembly) of wind turbines. The lift system of the present invention reduces or eliminates the need for large ground-based cranes to making corrective repairs to such wind turbine components. The lift system of the present invention is a nacelle-mountable system having a lifting capacity of up to at least 75 tonnes, and which can perform the same lifting work as a 600-ton conventional ground-based crane, while being easily mobilized to a site in fewer standard ISO containers.

The present lift system has all required rigging at the top of the wind turbine when mounted in the nacelle and does not require ground-based rigging or support cables running down to the ground, although a power cable may still be required in some cases to run from the generator to the ground. Therefore, the present lift system permits the rotor of the wind turbine to be turned into the wind when the lift system is installed and used, which reduces undesirable wind shear on the nacelle during erection and de-erection of wind turbine components. The present lift system also permits placing the rotor blades in the required position relative to the ground.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
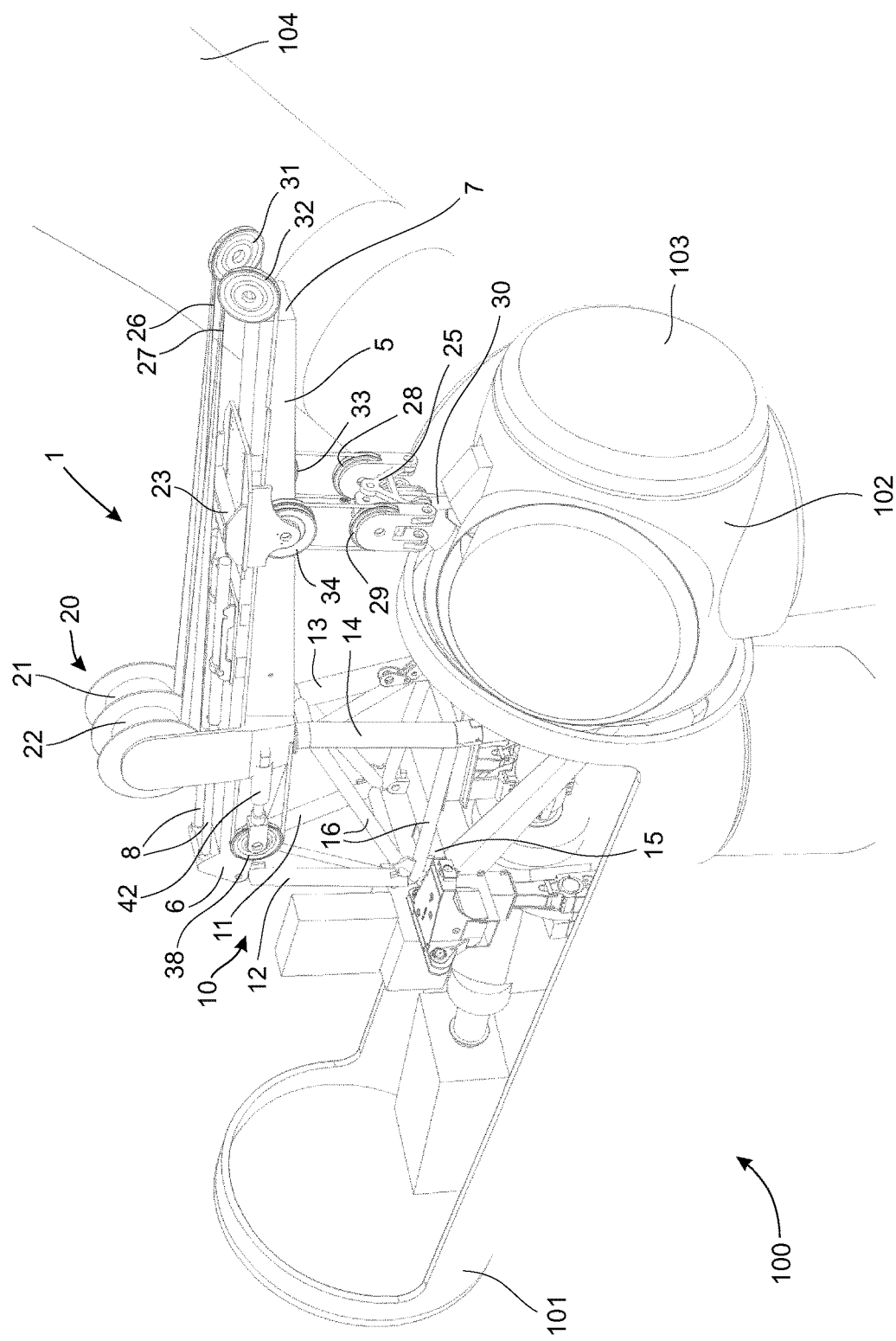
FIG. 1 depicts a schematic drawing of a front perspective view of a lift system mounted on a nacelle of a wind turbine.
Figure 2:
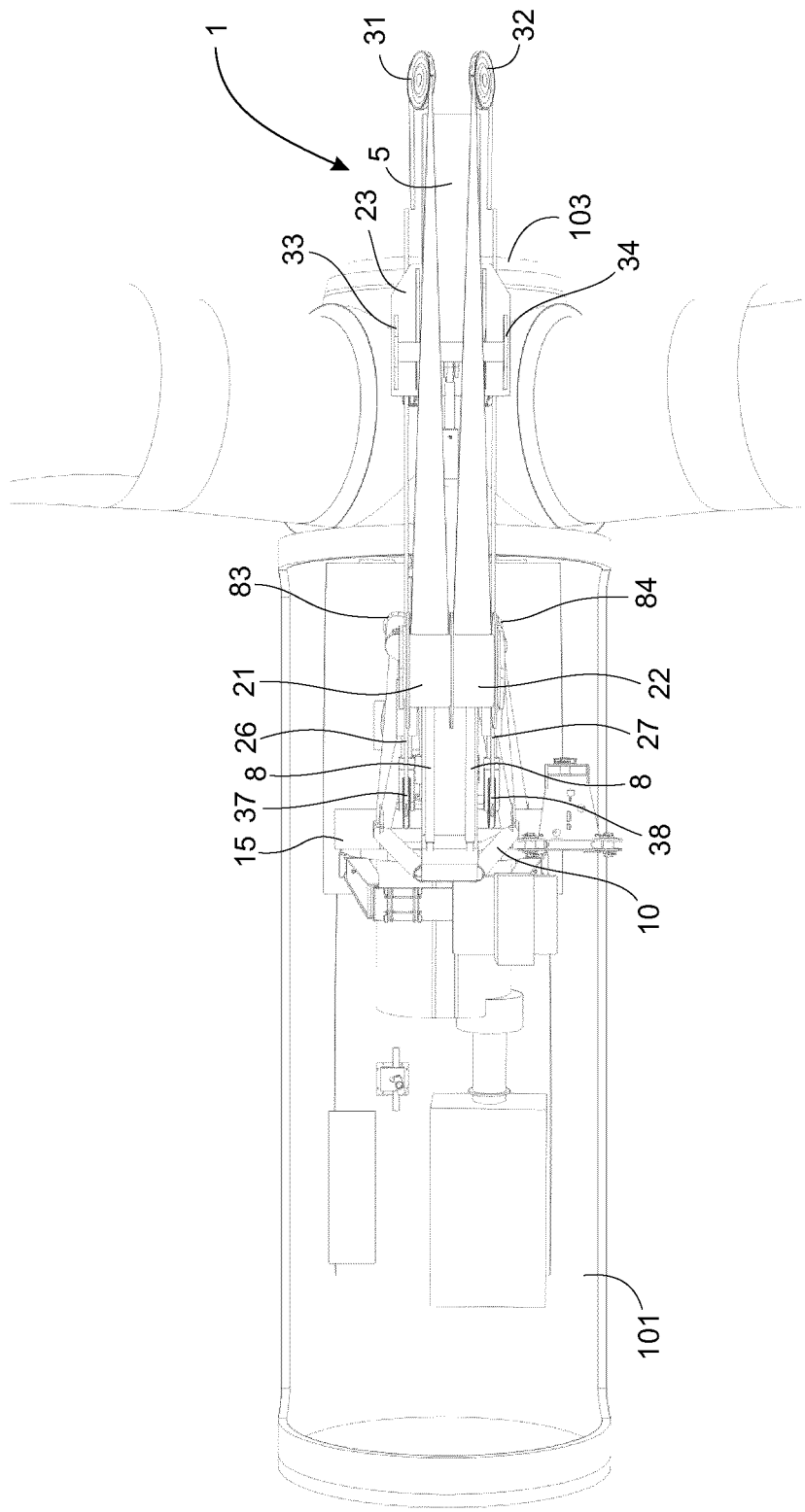
FIG. 2 depicts a top view of the lift system of FIG. 1.

With reference to the Figures, a lift system 1 mountable on a nacelle 101 of a wind turbine 100 comprises a canti-levered beam 5, a frame structure 10 on which the beam 5 is supported and a winch 20 mounted on the beam 5.

Figure 6:
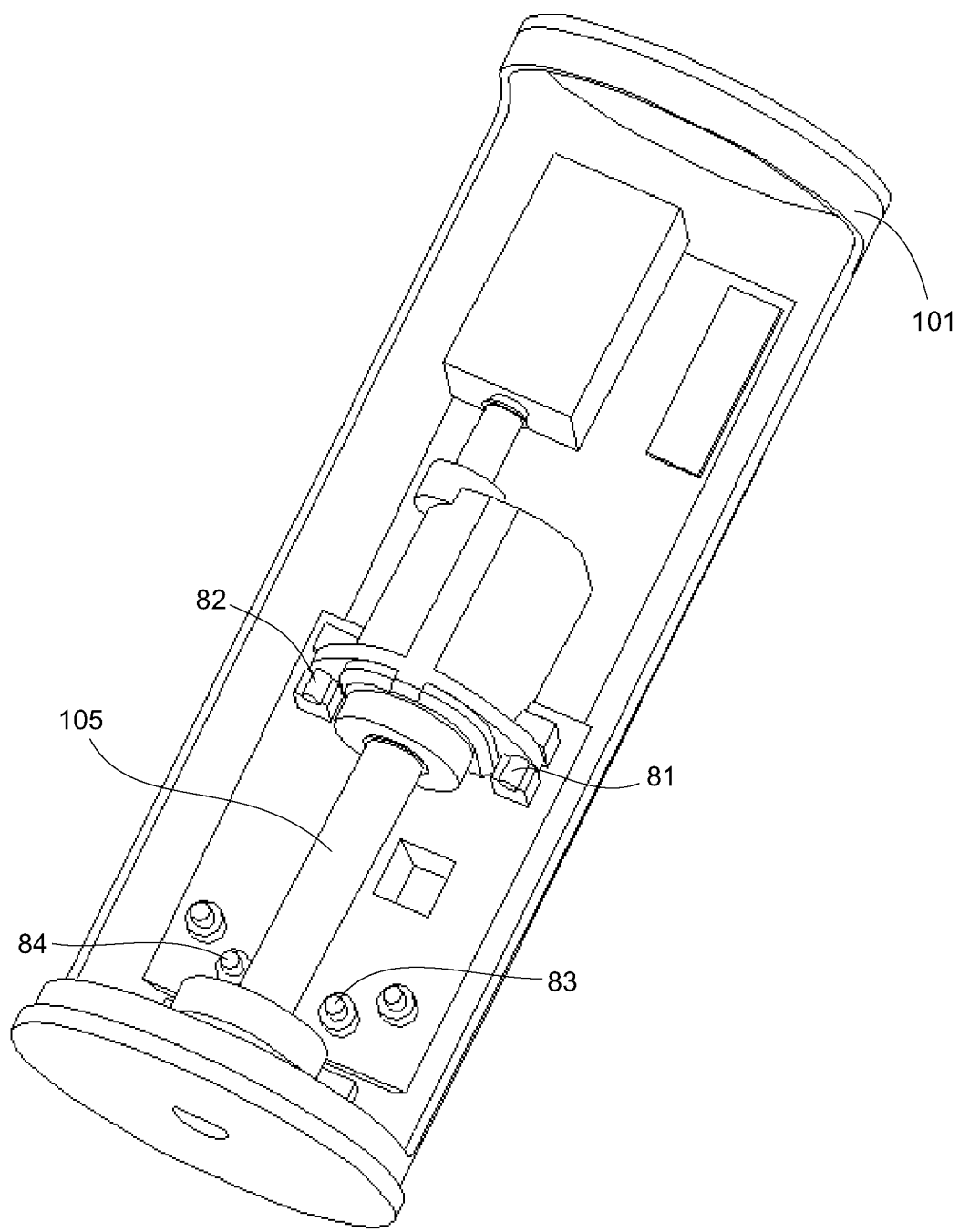
FIG. 6 depicts a schematic drawing of a top perspective view of a nacelle of a wind turbine illustrating mounting points for the lift system of FIG. 1.

The frame structure 10 comprises first, second, third and fourth upwardly extending struts 11, 12, 13, 14, respectively, connected to a proximal end 6 of the beam 5. The first and second struts 11, 12, respectively, are connected at the very end of the proximal end 6 while the third and fourth struts 13, 14, respectively, are connected to the proximal end 6 at a position longitudinally forward, with respect to the beam 5, of first and second struts 11, 12. The frame structure 10 comprises a base 15 on which the first and second struts 11, 12 are mounted. The base 15 is mountable on first and second front gearbox pillow blocks 81, 82, respectively, of the nacelle 101 (see FIG. 6), although the base 15 may be mountable on any structure in the nacelle 101 capable of supporting the weight of the lift system. The third and fourth struts 13, 14 are mountable on first and second yaw drive mounts 83, 84, respectively, of the nacelle 101 (see FIG. 6). The frame structure 10 further comprises a plurality of cross-braces 16 between the struts 11, 12, 13, 14 to provide structural rigidity to the frame structure 10. While the proximal end 6 of the beam 5 is supported on the frame structure 10, a distal end 7 of the beam 5 extends longitudinally forwardly, with respect to a major axis of the nacelle 101, which is laterally forward with respect to a vertical axis of the wind turbine 100 The distal end 7 of the beam 5 extends over a hub 102 of a rotor 103 of the wind turbine 100.

The winch 20 comprises a spool with two spool halves 21, 22 mounted atop the beam 5 at the proximal end 6 of the beam 5 so that the weight of the winch 20 is borne by the frame structure 10. A trolley 23 is mounted on trolley skidding track 8 on an upper surface of the beam 5. The trolley 23 is movable by sliding longitudinally along the beam 5 on the trolley skidding track 8. In one embodiment, the trolley 23 may comprise a bracket that engages the upper and side surfaces of the beam 5 and the trolley skidding track 8 may comprise one or more hydraulic cylinders, with the trolley 23 mounted to one or more cylinder rods of the one or more hydraulic cylinders, whereby actuation of the one or more hydraulic cylinders to extend and retract the cylinder rods causes the trolley 23 to move longitudinally on the beam 5. The trolley 23 may ride or slide on bearings between the bracket and the beam 5, if desired.

Cables 26, 27 wound around the spool halves 21, 22, respectively, connect the winch 20 to a fastener block 25 situated below the beam 5. The spool is driven by a motor so that the two spool halves 21, 22 are driven simultaneously at the same speed. The cables 26, 27 are isolated on to their respective spool halves 21, 22 by a divider. The cables 26, 27 are reeved from the spool halves 21, 22 through forward sheaves 31, 32, respectively, mounted on the distal end 7 of the beam 5. From the forward sheaves 31, 32, the cables 26, 27 are reeved through trolley sheaves 33, 34, respectively, mounted and moveable with the trolley 23. From the trolley sheaves 33, 34, the cables 26, 27 are reeved through fastener block sheaves 28, 29, respectively, mounted on the fastener block 25. From the through fastener block sheaves 28, 29, the cables 26, 27 are reeved back through the trolley sheaves 33, 34, respectively. From the trolley sheaves 33, 34, the cables 26, 27 are reeved through rearward sheaves 37, 38, respectively, to end terminations on the proximal end 6 of the beam 5. The cables 26, 27 are on opposite sides of the beam 5 so that the cables 26, 27 do not interfere with movement of the trolley 23 on the beam 5. A hook 30, or other fastener such as a lifting lug, is attached to the fastener block 25, the hook 30 depending downwardly to be able to fasten to a convenient part of a turbine component, for example the rotor 103 (see FIG. 4) or a main drive shaft assembly 105 (see FIG. 8).

The rearward sheaves 37, 38, are mounted on ends of hydraulic cylinders 41, 42, respectively. The opposite ends of the hydraulic cylinders 41, 42 are fixedly mounted on the beam 5. Actuation of the hydraulic cylinders 41, 42 adjusts the lengths of the cables 26, 27. The hydraulic cylinders 41, 42 are independently actuatable to so that the lengths of the cables 26, 27 can be independently and differentially adjusted. Differential adjustments of the cables 26, 27 causes the rotor 103 to move slightly to the left or right to allow alignment of the rotor 103 with the main drive shaft assembly 105 to be able to mount the rotor 103 on the drive shaft even when there is a side-wind that causes the rotor 103 to drift. Differential adjustments of the cables 26, 27 may also assist aligning the main drive shaft assembly 105 with the bearings and other components mounted in the nacelle 101 so that the main drive shaft assembly 105 may be smoothly withdrawn from the nacelle 101. Sequential operation of the hydraulic cylinders 41, 42 effectively permits steering the main drive shaft assembly 105 when necessary to smoothly remove the main drive shaft assembly 105 from the nacelle 101 by keeping a longitudinal axis of the main drive shaft assembly 105 aligned with a path required to remove the main drive shaft assembly 105 from the nacelle 101.

Figure 3:
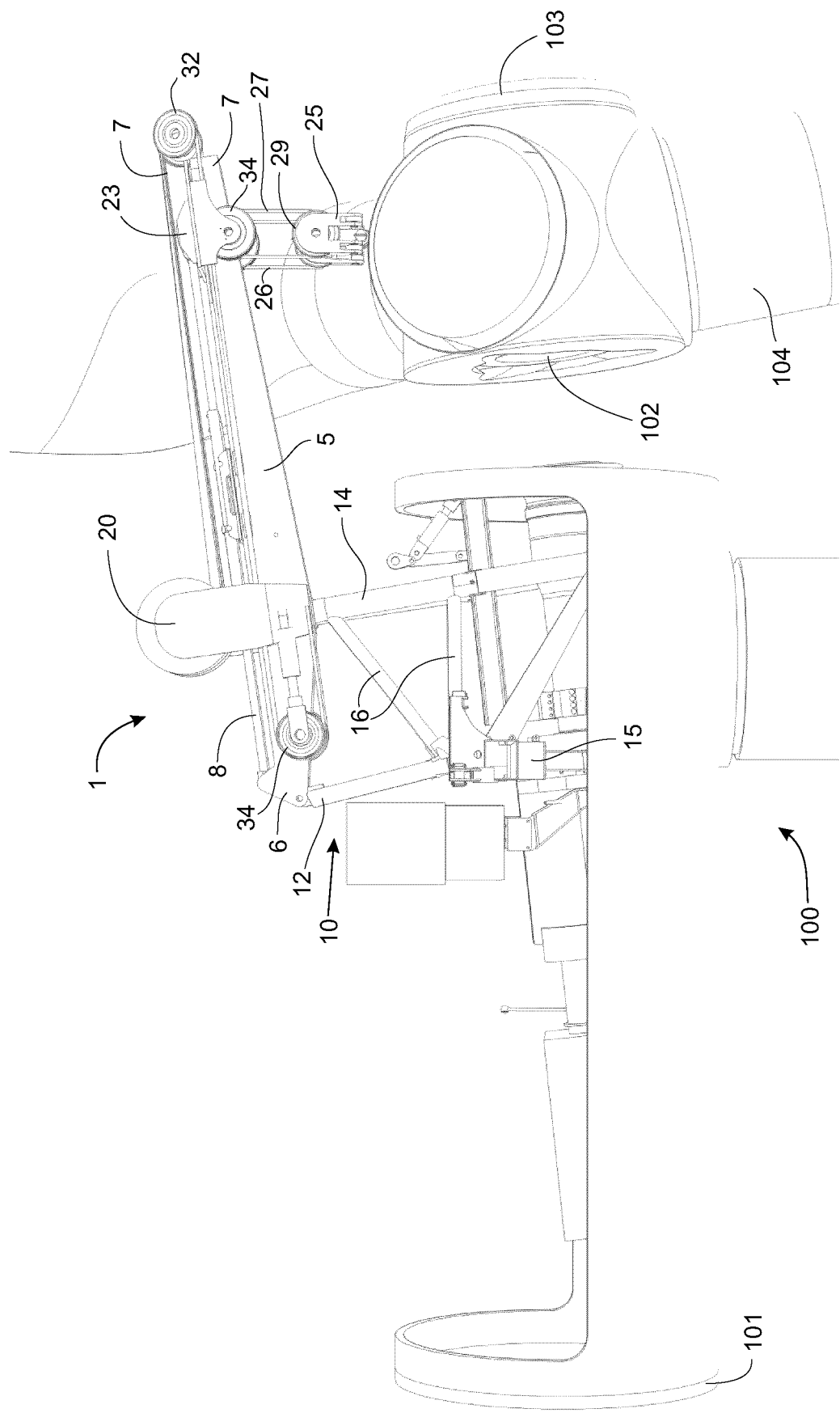
FIG. 3 depicts a side view of the lift system of FIG. 1 holding a dismounted rotor.
Figure 4:
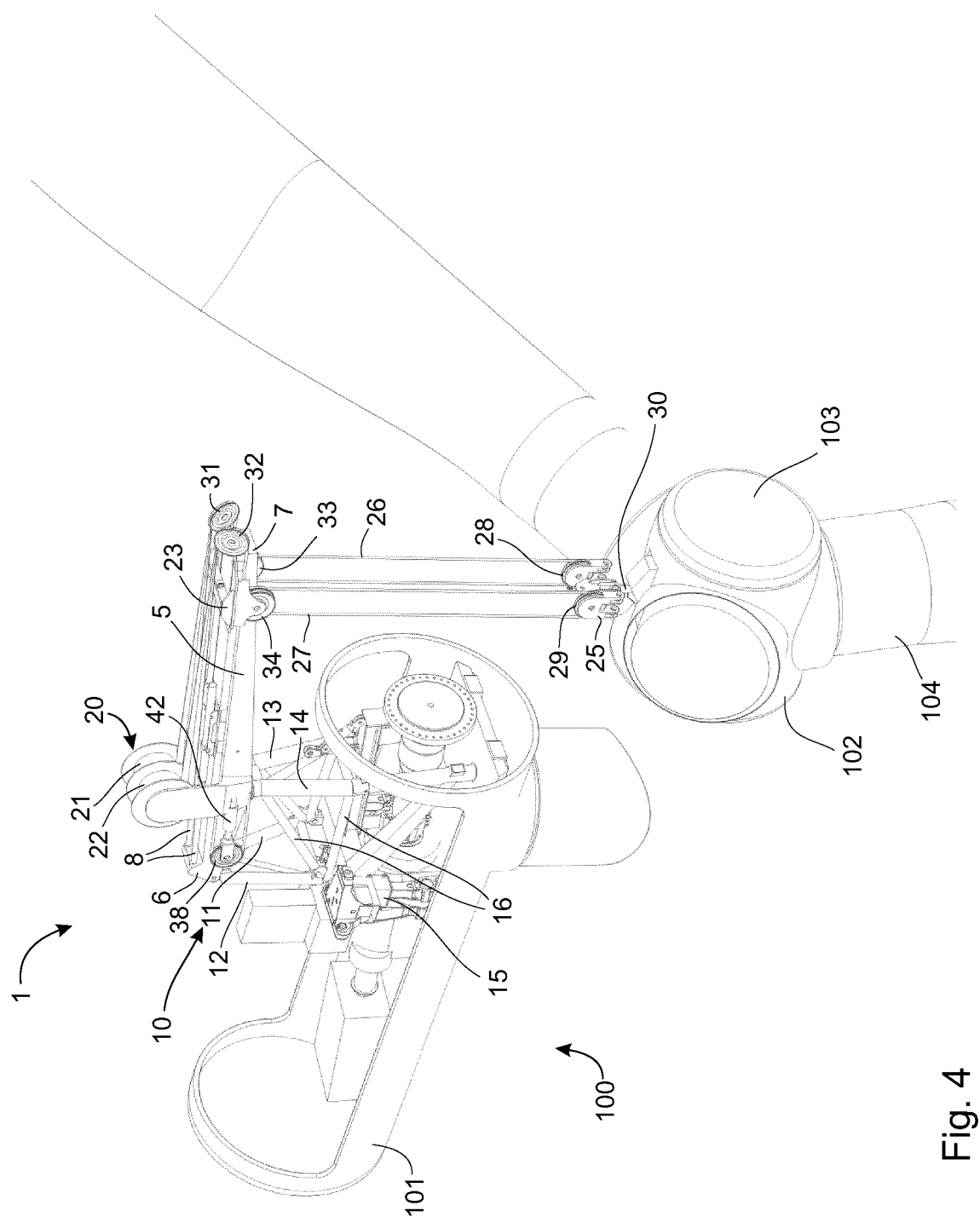
FIG. 4 depicts the lift system of FIG. 3 lowering the rotor.
Figure 5:
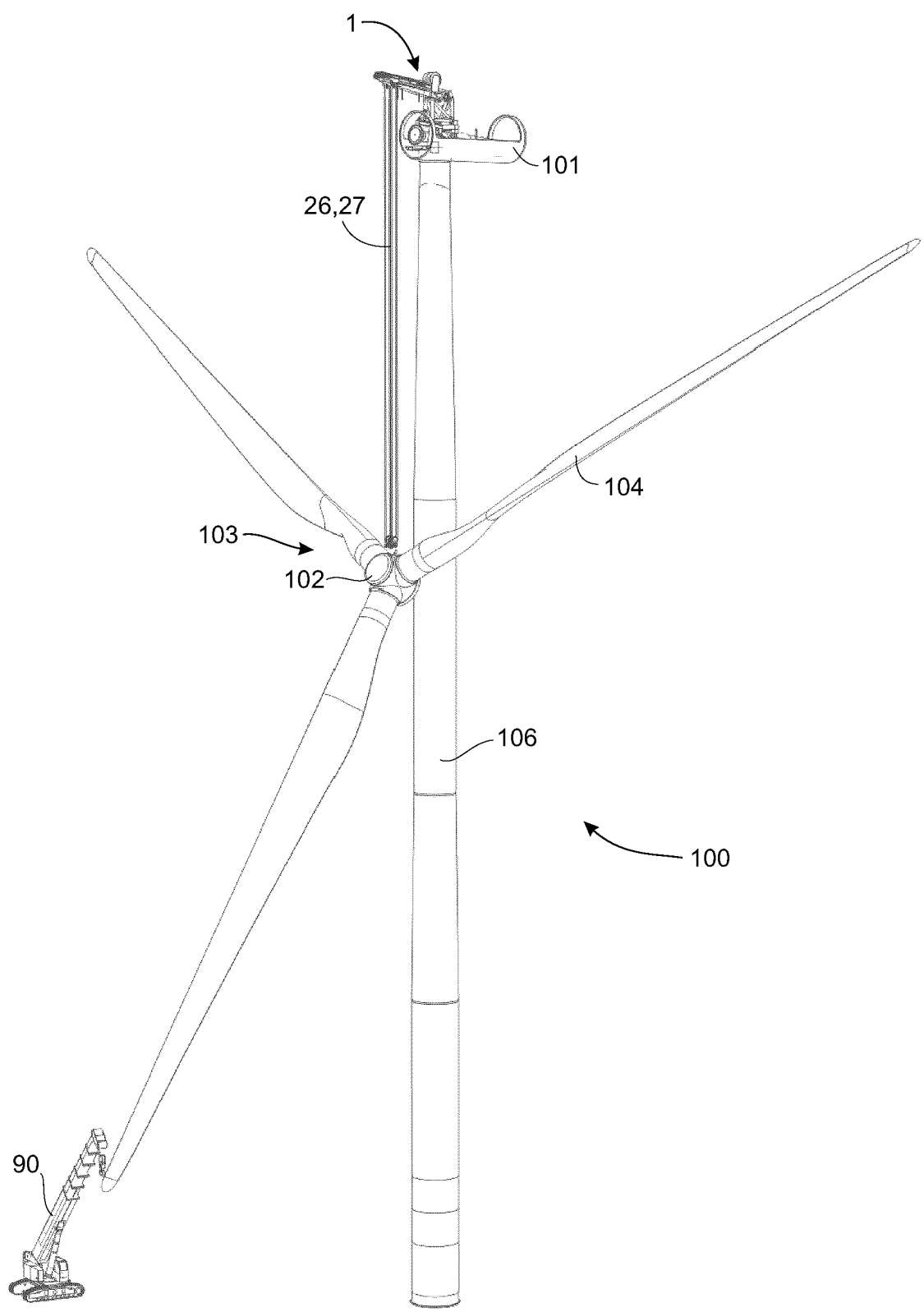
FIG. 5 depicts a schematic drawing of a wind turbine on which the lift system of FIG. 4 is mounted, the rotor having been lowered.

As illustrated in FIG. 1 to FIG. 5, the lift system 1 may be used to lower the fully-assembled rotor 103 from atop the wind turbine 100 to the ground. The hook 30 is attached to the hub 102 with blades 104 of the rotor 103 still attached to the hub 102, bolts securing the hub 102 to the nacelle 101 are loosened and the trolley 23 is moved to the distal end 7 of the beam 5. The hub 102 is then dismounted from the nacelle 101 as seen in FIG. 3, and the winch 20 operated to lower the rotor 103 as seen in FIG. 4. Because all of the rigging for the lift system 1 is located on the wind turbine 100, the rotor 103 can be turned into the wind for lowering to prevent wind loading on the rotor 103. Further, the cables 26, 27 are situated forward of the nacelle 101 so the nacelle 101 does not interfere with lowering the rotor 103. As seen in FIG. 5, a small mobile ground-based crane 90 may be attached to an end of one of the blades 104 simply to help stabilize and guide the rotor 103 while the rotor 103 is being lowered. Tag lines (not shown) may also be used on upwardly extending blades 104 to prevent rotation of the rotor 103 around an axis perpendicular to a plane of the blades 104. Reversing the procedure can be done to re-install the rotor 103.

Figure 7:
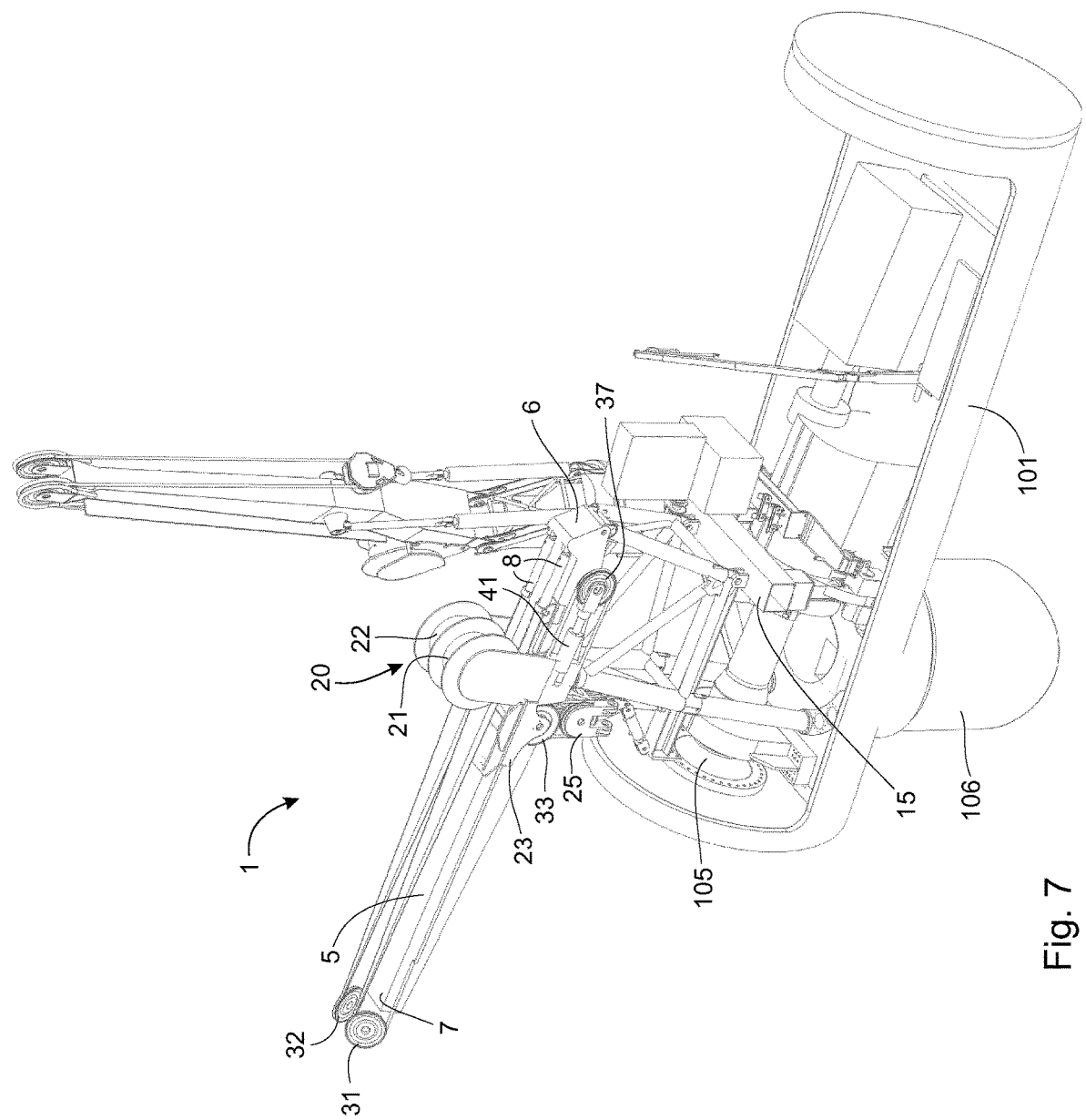
FIG. 7 depicts the lift system of FIG. 1 positioned for removal of a main shaft assembly of the wind turbine.
Figure 8:
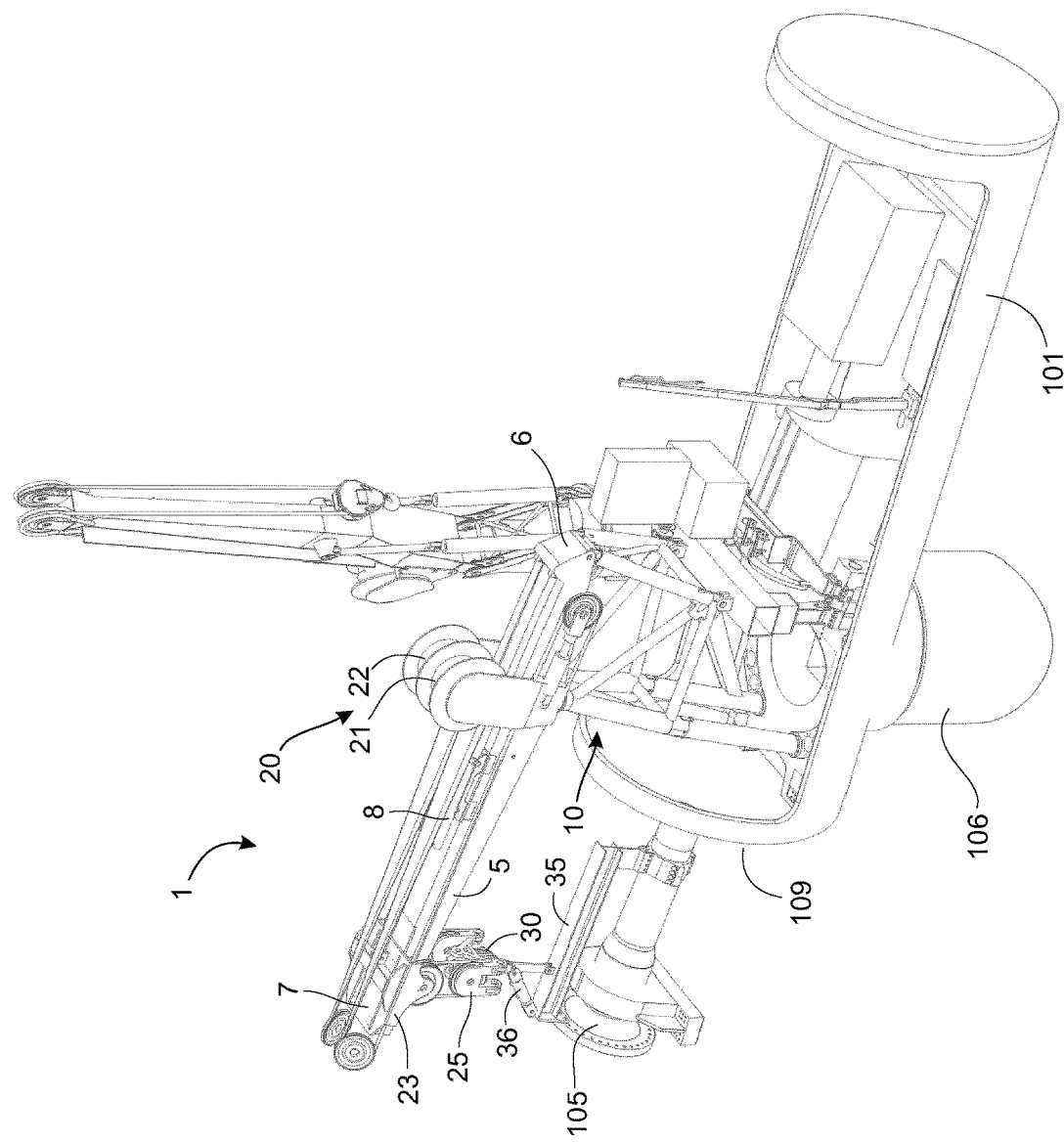
FIG. 8 depicts the lift system of FIG. 7 with the main shaft assembly removed; and, FIG. 9 depicts a schematic drawing of the lift system of FIG. 1 mounted on the nacelle together with auxiliary cranes used to mount the lift system on the nacelle.
Figure 9:
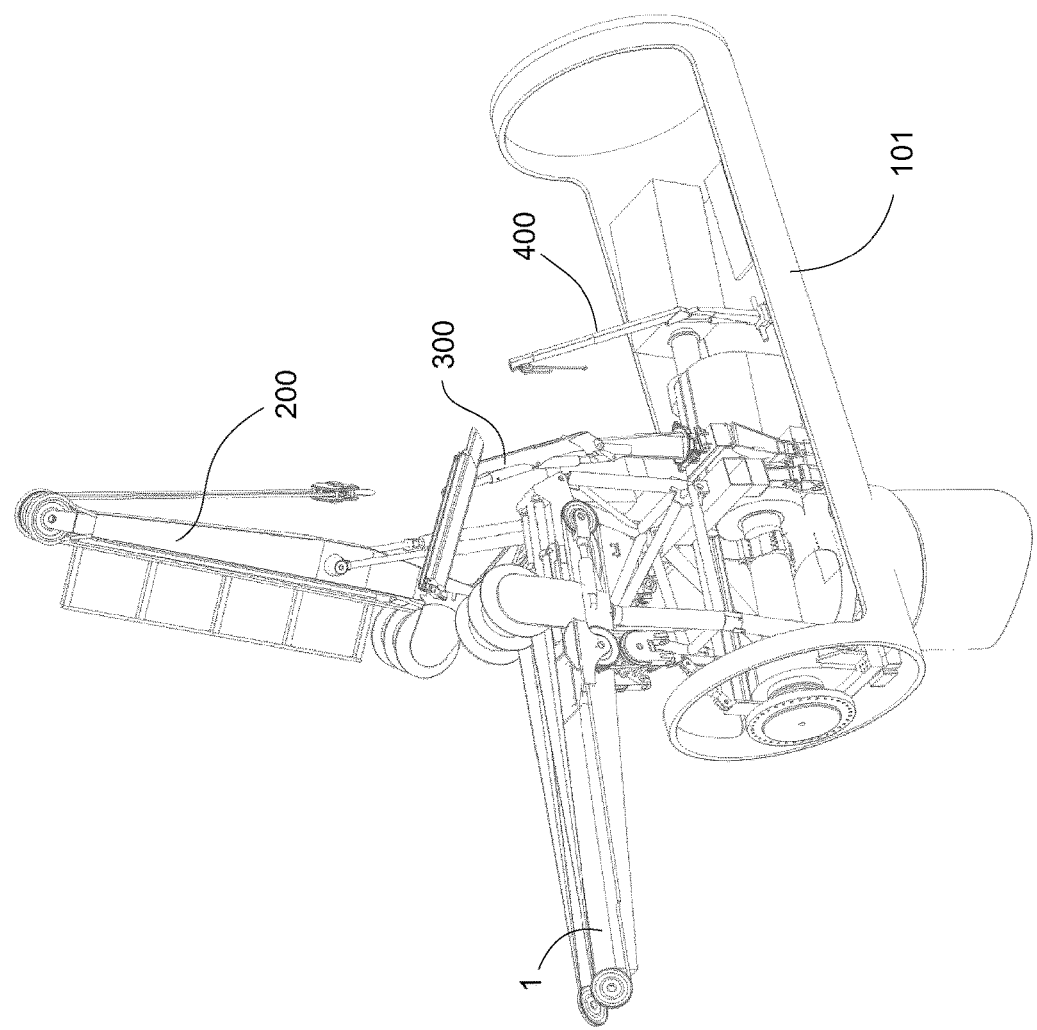

As illustrated in FIG. 7 to FIG. 8, the lift system 1 may be used to lower the fully-assembled main drive shaft assembly 105 from atop the wind turbine 100 to the ground. The trolley 23 is moved closer to the proximal end 6 of the beam 5 to a position over the main shaft assembly 105 where the hook 30 can be attached to the main shaft assembly 105, for example with the assistance of a lifting tool 35. The lifting tool 35 may comprise an adjustment tool 36 (e.g. a manual or a hydraulic tool) to change the angle of the main drive shaft assembly 105. The main drive shaft assembly 105 is slightly angled when mounted in the nacelle 101 relative to the horizontal to account for wind loading on the rotor blades 104 to prevent interference between the rotor blades 104 and a tower 106 of the wind turbine 100 when the wind is blowing. The angle of the main drive shaft assembly 105 is generally in a range of about 3-10° with respect to the horizontal, preferably 3-8°, for example about 6°. In order to remove the rotor 103 from the nacelle 101, the rotor 103 about must be drawn out at this angle relative to the horizontal. In order to remove the main drive shaft assembly 105 from the gearbox, the main drive shaft assembly 105 may need to be drawn out at a steeper angle relative to the horizontal, for example about 8.5°, to be able to clear some stud bolts. Further changing of the angle of the main drive shaft assembly 105 is accomplished with the adjustment tool 36. The angles are different for different makes of wind turbine, hence a need for a way of adjusting the angle of the lifting tool 35.

Alternatively to, or in addition to, using the adjustment tool 36, the beam 5 is mounted on the frame structure 10 at an angle to the horizontal, the angle of the beam 5 matching the angle of the main drive shaft assembly 105 so that the trolley 23 moves along the beam 5 along a line parallel to the longitudinal axis of the main drive shaft assembly 105, thereby permitting drawing of the rotor 103 off the main drive shaft assembly 105 without the need to use the adjustment tool 36. The angle of the beam 5 may be adjusted by using third and fourth struts 13, 14 of different length to match the main drive shaft assembly angle for the particular make of wind turbine. The adjustment tool 36 may be used to further adjust the angle of the main drive shaft assembly 105 after the rotor 103 has been drawn off the main drive shaft assembly 105 so that the main drive shaft assembly 105 can be drawn out of the nacelle 101 without the main drive shaft assembly 105 jamming on or otherwise striking the nacelle 101.

Once the lift system 1 is connected to the main shaft assembly 105, the main drive shaft assembly 105 is disconnected from the nacelle 101. With the main drive shaft assembly 105 disconnected from the nacelle 101, the trolley 23 is moved longitudinally forward to the distal end 7 of the beam 5 as seen in FIG. 8 so that the main drive shaft assembly 105 clears a front 109 of the nacelle 101. The lifting tool 35 or the hook 30 may also have a swivel to allow rotation of the main drive shaft assembly 105 to create more clearance for the main drive shaft assembly 105 once the main drive shaft assembly 105 clears the front 109 of the nacelle 101. The main shaft drive assembly 105 can then be lowered to the ground by the winch 20. Reversing the procedure can be done to re-install the main drive shaft assembly 105.

The lift system 1 is very large. To mount the lift system 1 on the nacelle 101, a first auxiliary crane 200 may be used to lift the parts of the lift system 1 up to the nacelle 101 of the wind turbine 100 where the lift system 1 is assembled. The first auxiliary crane 200 is also a large crane, though not as large as the lift system 1. A second auxiliary crane 300 may be used to lift the parts of the first auxiliary crane 200 up to the nacelle 101 where the first auxiliary crane 200 is assembled. The second auxiliary crane 300 is also a large crane, though not as large as the first auxiliary crane 200. A third auxiliary crane 400 may be used to lift the parts of the second auxiliary crane 300 up to the nacelle 101 where the second auxiliary crane 300 is assembled. The third auxiliary crane 400 may be an existing nacelle-mounted service crane that is included with the wind turbine 100 when the turbine 100 is built.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A lift system mountable in a nacelle of a wind turbine, the lift system comprising:

a boom comprising a proximal end and a distal end, the proximal end of the boom mountable in the nacelle, the distal end of the boom extending over a hub of a rotor of the wind turbine when the lift system is mounted in the nacelle;

a frame structure for mounting the proximal end of the boom in the nacelle;

a winch mounted to the boom;

a fastener situated below the boom and operatively connected to the winch by at least one cable; and, a trolley movably mounted to the boom to permit translation of the trolley longitudinally along the boom, the at least one cable reeved through at least one trolley sheave mounted on and moveable with the trolley thereby permitting longitudinal movement of the fastener with respect to the boom when the trolley translates longitudinally along the boom, the at least one cable comprising first and second cables between the winch and the fastener passing, respectively, on first and second transverse sides of the boom so that the cables do not interfere with longitudinal translation of the trolley on the boom, wherein lengths of the first and second cables are independently adjustable to permit steering a load connected to the fastener.

2. The lift system of claim 1, wherein the boom is a beam.

3. The lift system of claim 1, wherein the first cable is linked to a first hydraulic cylinder mounted on the first side of the beam and the second cable is linked to a second hydraulic cylinder mounted on the second side of the beam, wherein the first and second hydraulic cylinders are independently actuatable to independently adjust the lengths of the first and second cables.

4. The lift system of claim 1, wherein the wind turbine further comprises a main drive shaft mounted in the nacelle, the main drive shaft having a longitudinal axis oriented at a non-zero angle away from horizontal, and wherein the boom has a longitudinal axis substantially parallel to the longitudinal axis of the main drive shaft.

5. The lift system of claim 4, wherein the non-zero angle is in a range of 3-10°.

6. The lift system of claim 4, wherein the trolley translates longitudinally along a path substantially parallel to the longitudinal axis of the main drive shaft.

7. The lift system of claim 1, wherein the winch is mounted on an upper surface of the boom.

8. The lift system of claim 1, wherein the winch is mounted underneath the boom.

9. The lift system of claim 1, wherein the winch is mounted on the trolley and moves with the trolley.

10. The lift system of claim 1, wherein the frame structure comprises: a mounting base mountable on a structure in the nacelle capable of supporting all forces imparted to the nacelle by the lift system; and, a plurality of upwardly extending support struts, wherein at least one of the support struts is supportable on the mounting base and at least one of the support struts is mountable at a position in the nacelle proximate a main bearing of the wind turbine.

11. The lift system of claim 10, wherein the plurality of upwardly extending support struts comprises a first strut mountable on the mounting base over a first gearbox pillow block of the nacelle, a second strut mountable on the mounting base over a second gearbox pillow block of the nacelle, a third strut mountable at a first position in the nacelle proximate the main bearing and a fourth strut mountable at a second position in the nacelle proximate the main bearing.

12. The lift system of claim 11, wherein the trolley extends transversely beyond transverse sides of the boom, the at least one trolley sheave comprises a first trolley sheave on a first transverse side of the boom and a second trolley sheave on a second transverse side of the boom, and the at least one cable is reeved through the first and second trolley sheaves.

13. The lift system of claim 10, wherein the structure capable of supporting the weight of the lift system comprises pillow blocks of a gearbox of the wind turbine.

14. The lift system of claim 1, wherein the fastener comprises a hook or a lifting lug.

15. The lift system of claim 1, wherein the beam comprises a trolley skidding track on which the trolley is movably mounted.

* * * * *